(12) United States Patent
Cheng et al.

(10) Patent No.: US 11,733,589 B1
(45) Date of Patent: Aug. 22, 2023

(54) CAMERA STRUCTURE AND DISPLAY DEVICE

(71) Applicants: Inventec (Pudong) Technology Corporation, Shanghai (CN); INVENTEC CORPORATION, Taipei (TW)

(72) Inventors: Kuo-Yang Cheng, Taipei (TW); Yun-Chien Yen, Taipei (TW); Kuang Luo, Taipei (TW); Nien-Yu Pang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/806,275

(22) Filed: Jun. 10, 2022

(30) Foreign Application Priority Data

Mar. 14, 2022   (CN) .......................... 202210245509.7

(51) Int. Cl.
*H04N 23/50*   (2023.01)
*G03B 11/04*   (2021.01)

(52) U.S. Cl.
CPC .......... *G03B 11/043* (2013.01); *H04N 23/50* (2023.01)

(58) Field of Classification Search
CPC .............................. G03B 11/043; H04N 23/50
See application file for complete search history.

(56) References Cited

U.S. PATENT DOCUMENTS

| 8,227,717 | B2* | 7/2012 | Lu | H01H 21/24 200/341 |
| 10,594,845 | B2* | 3/2020 | Hébert | H04M 1/0249 |
| 2004/0127270 | A1* | 7/2004 | Wulff | H05K 7/1418 455/575.4 |
| 2023/0164254 | A1* | 5/2023 | Tal | H04M 1/0277 455/575.1 |

FOREIGN PATENT DOCUMENTS

| CN | 103246127 A | 8/2013 |
| CN | 108873574 A | 11/2018 |
| CN | 111522120 A | 8/2020 |
| TW | M577525 U | 5/2019 |
| TW | 201935119 A | 9/2019 |

* cited by examiner

*Primary Examiner* — Mekonnen D Dagnew
(74) *Attorney, Agent, or Firm* — CKC & Partners Co., LLC

(57) ABSTRACT

A camera structure includes a support frame, a camera, a camera switch and a latch mechanism. The camera is supported by the support frame. The camera switch is spatially separated from the camera. The camera switch is configured to enable and disable the camera. The latch mechanism includes a slidable latch body and a cover and a connecting rod linking the latch body. The latch body is configured to move between a first position and a second position. When the latch body is at the first position, the camera is exposed from a first opening of the cover and the connecting rod interferes with the camera switch to enable the camera. When the latch body is at the second position, the cover shields the camera and the connecting rod moves away from the camera switch to enable the camera.

20 Claims, 9 Drawing Sheets

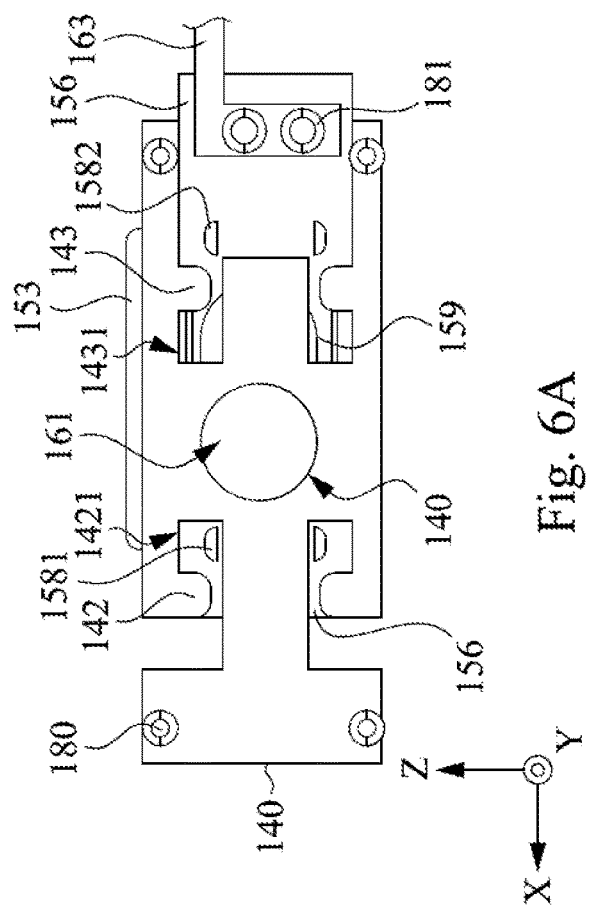
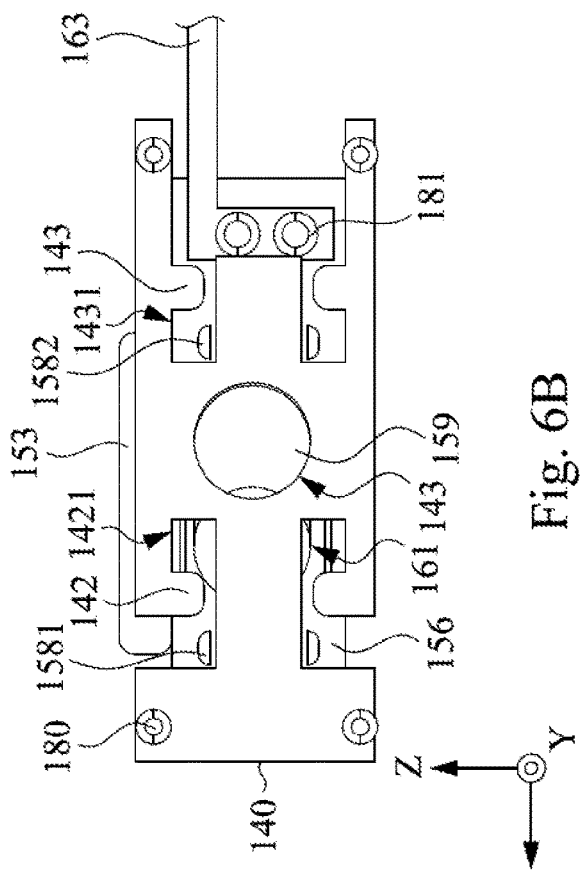
Fig. 6A
Fig. 6B

CAMERA STRUCTURE AND DISPLAY DEVICE

RELATED APPLICATIONS

This application claims priority to China Application Serial Number 202210245509.7, filed Mar. 14, 2022, which is herein incorporated by reference in its entirety.

BACKGROUND

Field of Invention

The present disclosure relates to camera structures and display devices.

Description of Related Art

With the advance of technology, it is common to use cameras to create audio and video content. A camera can be arranged on the frame of the display device. For example, some portable electronic devices may be provided with cameras. However, once someone activates the camera of the electronic device remotely to capture images of the user of the electronic device without the knowing of the user, the privacy of the user would be seriously affected. A way to avoid such situation is to use a real cover to shield the camera. However, such an approach is likely to bring inconvenience to the use of the camera. For example, the user may forget to use the real cover to block after disenabling the camera. Alternatively, when the user temporarily wants to enable the camera, the real cover is not removed and images cannot be captured by the camera.

Therefore, how to provide a technical solution to find a balance between protecting the privacy of the user and facilitating the use of the camera is one of the problems to be solved by those skilled in the art.

SUMMARY

One embodiment of the present disclosure related to a camera structure.

According to one embodiment of the present disclosure, a camera structure includes a support frame, a camera, a camera switch and a latch mechanism. The camera is supported by the support frame. The camera switch is electrically connected to the camera and configured to enable and disable the camera. The latch mechanism includes a slidable latch body and a cover and a connecting rod linking the latch body. The latch body is configured to move between a first position and a second position. When the latch body is at the first position, the camera is exposed from a first opening of the cover and the connecting rod interferes with the camera switch to enable the camera. When the latch body is at the second position, the cover shields the camera and the connecting rod moves away from the camera switch to enable the camera.

In one or more embodiments of the present disclosure, the latch mechanism includes a holder. The holder is connected to the latch body and has an accommodating groove accommodating the cover. A depth of the accommodating groove is greater than a thickness of the cover, so that the cover is spatially separated from the camera.

In some embodiments of the present disclosure, a material of the holder comprises polyoxymethylene.

In some embodiments of the present disclosure, the connecting rod of the latch mechanism is connected to one side of the holder. The connecting rod bypasses the support frame on which the camera is supported.

In one or more embodiments of the present disclosure, the camera structure further includes a shutter. The camera and the latch mechanism are covered by the shutter. When the latch body is at the first position, the first opening of the cover is aligned with a second opening of the shutter, so that the camera is exposed from the second opening.

In some embodiments of the present disclosure, the shutter further comprises a strip slit. The latch body of the latch mechanism protrudes from the strip slit to be touched. The latch body is moved between the first position and the second position.

In some embodiments of the present disclosure, the camera structure further includes a transparent cover. The transparent cover is disposed below the latch body protruding from the strip slit. The second opening of the shutter is covered by the transparent cover.

In some embodiments of the present disclosure, the camera structure further includes a locking member. The locking member abuts the latch mechanism to the shutter. The locking member has a channel on a first surface of the locking member facing the shutter. The channel of the locking member is sealed by the shutter to form a closed track. The closed track is configured to accommodate the latch body so that the latch body of the latch mechanism slides relative to the locking member and the shutter.

In some embodiments of the present disclosure, the locking member comprises a second surface opposite to the first surface and has a first elastic piece at one end of the channel of the locking member and a first protrusion protruding towards the second surface. The first elastic piece and the second surface of the locking member form a first accommodating space. The first accommodating space is configured to accommodate the first protrusion of the locking member. The first protrusion is held in the first accommodating space when the latch body is at the first position. The first protrusion moves out of the first accommodating space through the first elastic piece when the latch body moves to the second position from the first position.

In some embodiments of the present disclosure, the locking member comprises a second surface opposite to the first surface and has a second elastic piece at one end of the channel of the locking member and a second protrusion protruding towards the second surface. The second elastic piece and the second surface of the locking member form a second accommodating space. The second accommodating space is configured to accommodate the second protrusion of the locking member. The second protrusion is out of the second accommodating space when the latch body is at the first position. The second protrusion moves into the second accommodating space through the second elastic piece when the latch body moves to the second position from the first position.

One embodiment of the present disclosure related to a camera structure.

According to one embodiment of the present disclosure, the camera structure includes a camera, a camera switch and a latch mechanism being movable relative to the camera and the camera switch. The camera switch is electrically connected to the camera and configured to enable and disable the camera. The latch mechanism includes a holder, a cover, a connecting rod and a latch body. The cover is supported by the holder and has a first opening. The connecting rod extends to the camera switch and has an end fixed on the holder. The latch body is extended from the holder and configured to move between a first position and a second position. The camera is exposed from the first opening of the cover and the connecting rod interferes with the camera switch to enable the camera when the latch body is at the first position. The cover shields the camera and the connecting rod moves away from the camera switch to disenable the camera when the latch body is at the second position.

In one or more embodiments of the present disclosure, the camera structure further includes a shutter. The camera and the latch mechanism are covered by the shutter. When the latch body is at the first position, the first opening of the cover is aligned with a second opening of the shutter, so that the camera is exposed from the second opening.

In some embodiments of the present disclosure, the shutter further comprises a strip slit. The latch body of the latch mechanism protrudes from the strip slit to be touched. The latch body is moved between the first position and the second position.

In some embodiments of the present disclosure, the camera structure further includes a transparent cover. The transparent cover is disposed below the latch body protruding from the strip slit. The second opening of the shutter is covered by the transparent cover.

In some embodiments of the present disclosure, the camera structure further includes a locking member. The locking member abuts the latch mechanism to the shutter. The locking member has a channel on a first surface of the locking member facing the shutter. The channel of the locking member is sealed by the shutter to form a closed track. The closed track is configured to accommodate the latch body so that the latch body of the latch mechanism slides relative to the locking member and the shutter.

In one or more embodiments of the present disclosure, a material of the holder comprises polyoxymethylene.

In one or more embodiments of the present disclosure, the camera switch comprises a switch button.

One embodiment of the present disclosure related to a display device.

According to one embodiment of the present disclosure, a display device includes a display panel, a bezel surrounding the display panel and a camera structure disposed at the bezel and above the display panel. The camera structure includes a camera, a camera switch electrically connected to the camera and configured to enable and disable the camera and a latch mechanism being movable relative to the camera and the camera switch. The latch mechanism has a first opening, when the latch mechanism is at a first position, the first opening of the latch mechanism exposes the camera and the latch mechanism touches the camera switch to enable the camera, and when the latch mechanism is at a second position, the first opening of the latch mechanism is misaligned with the camera and the latch mechanism moves away from the camera switch to disable the camera.

In one or more embodiments of the present disclosure, the camera structure further includes a shutter. The camera and the latch mechanism are covered by the shutter. When the l latch mechanism is at the first position, the first opening of the latch mechanism is aligned with a second opening of the shutter, so that the camera is exposed from the second opening.

In some embodiments of the present disclosure, the display device further includes a transparent cover disposed below the latch mechanism protruding from the shutter. The second opening of the shutter is covered by the transparent cover. The transparent cover extends beyond the shutter and covers the display panel.

In summary, a camera structure is provided in one or more embodiments of the present disclosure. The camera structure can prevent the user from starting the capturing function of the camera without knowing it, thereby protecting the privacy of the user.

BRIEF DESCRIPTION OF THE DRAWINGS

In order to make the above and other objects, features, advantages, and embodiments of the present disclosure more comprehensible, the description of the drawings is as follows:

FIGS. 6A and 6B are rear views illustrating the assembly of the latch mechanism and the locking member of the camera structure according to one embodiment of the present disclosure;

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

In addition, terms used in the specification and the claims generally have the usual meaning as used in the field, in the context of the invention and in the context of the particular content unless particularly specified. Some terms used to describe the invention are to be discussed below or elsewhere in the specification to provide additional guidance related to the description of the invention to specialists in the art.

The phrases "first," "second," etc., are solely used to separate the descriptions of elements or operations with the same technical terms, and are not intended to convey a meaning of order or to limit the invention.

Additionally, the phrases "comprising," "includes," "provided," and the like, are all open-ended terms, i.e., meaning including but not limited to.

Further, as used herein, "a" and "the" can generally refer to one or more unless the context particularly specifies otherwise. It will be further understood that the phrases "comprising," "includes," "provided," and the like used herein indicate the stated characterization, region, integer, step, operation, element and/or component, and does not exclude additional one or more other characterizations, regions, integers, steps, operations, elements, components and/or groups thereof.

In order to effectively prevent the unintended activation of the camera from affecting user privacy, and to take into account the convenience of use, an improved camera structure of the present disclosure is provided, wherein a camera of the camera structure can be physically shielded and simultaneously physically disenabled at the same time.

Figure 1:
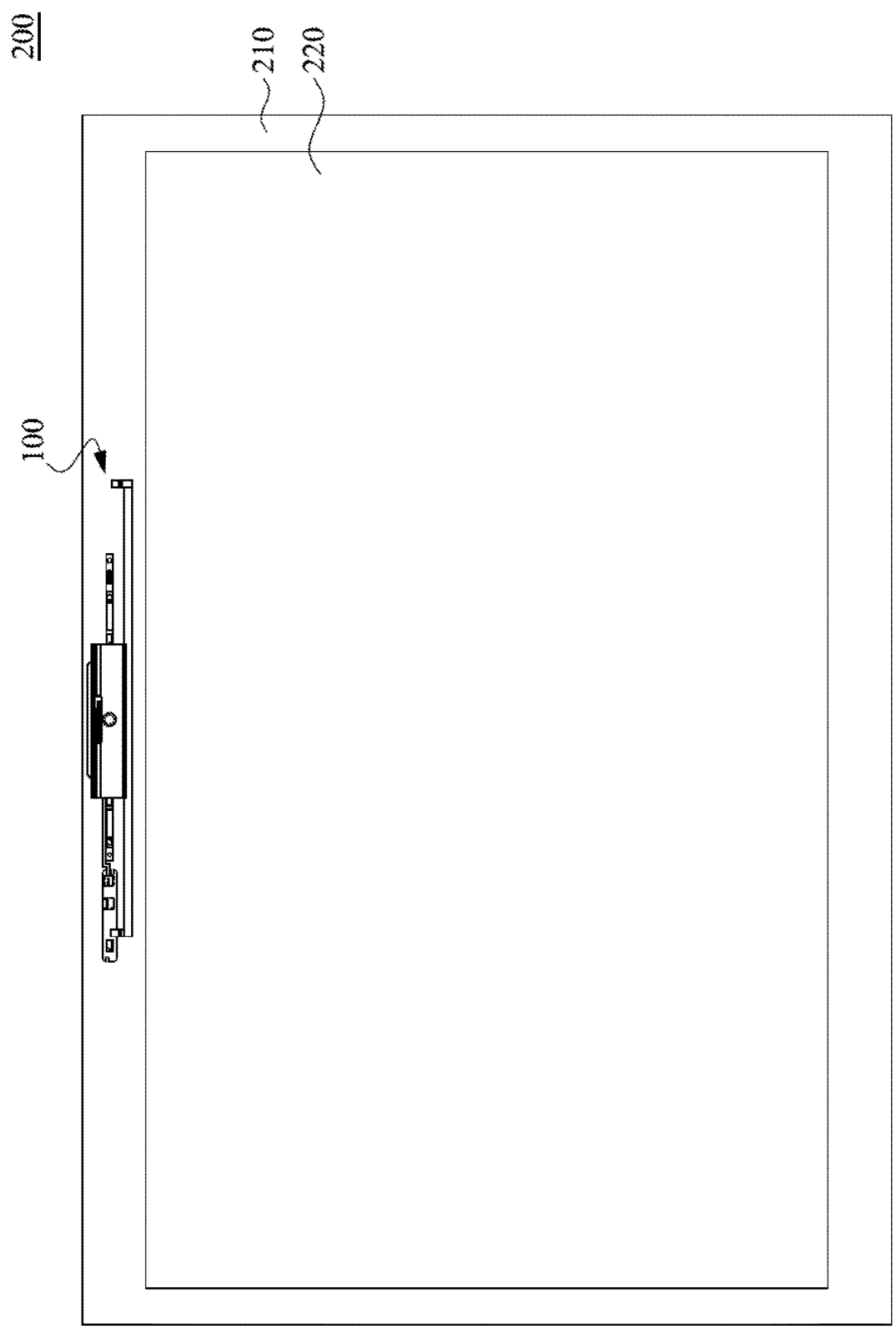
FIG. 1 illustrates a schematic view of a display device according to one embodiment of the present disclosure.

Reference is made by FIG. 1. FIG. 1 illustrates a schematic view of a display device 200 according to one embodiment of the present disclosure.

As shown in FIG. 1, the display device 200 includes a display panel 220 and a bezel 210 surrounding the display panel 220. The display panel 220 can be used to display images.

In some embodiments of the present disclosure, the camera structure 100 may be disposed at the bezel 210 above the display panel 220, and the front side of the camera structure 100 faces the user to capture a front image of the user.

In some embodiments, the display device 200 can be a display device of a portable electronic device, for example, a screen of a notebook computer, but not limited to the present disclosure. In some embodiments, the camera structure 100 can be used with other types of electronic devices (e.g., servers) to provide corresponding imaging display functions.

Figure 2:
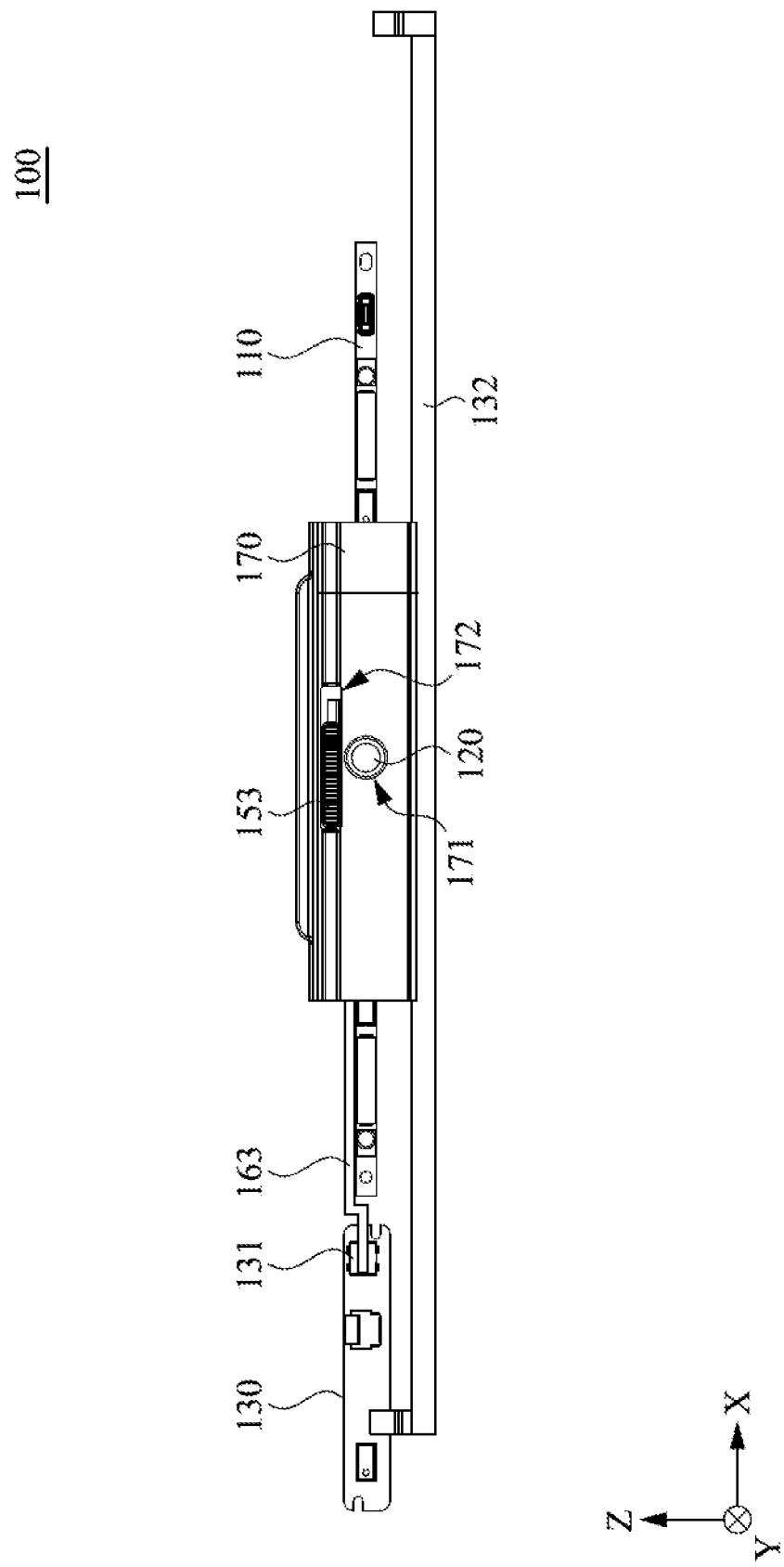
FIG. 2 illustrates a schematic view of a camera structure according to one embodiment of the present disclosure.

Reference is made by FIG. 2 to further describe the specific structure of the camera structure of the present disclosure. FIG. 2 illustrates a schematic view of a camera structure 100 according to one embodiment of the present disclosure.

In the embodiment shown in FIG. 2, the camera structure 100 includes a support frame 110, a camera 120, a camera switch 131 that is spatially separated from the camera 120, and a shutter 170, and a slidable latch mechanism. The slidable latch mechanism includes a latch body 153 protruding from a slit 172 of the shutter 170.

The camera 120 is disposed on the support frame 110. In the embodiment shown in FIG. 2, the camera 120 is exposed from an opening 171 of the shutter 170. In some embodiments, the camera 120 can be shielded by manually sliding the latch body 153 protruding from the slit 172 of the latch body 153. For detailed structure, please refer to the following description.

In FIG. 2, the camera 120 and the camera switch 131 of the camera 120 are spatially separated. The camera switch 131 is configured to enable or disable the camera 120 from being enabled. For example, the camera switch 131 can be controlled to enable or disable the camera 120 through an electrical conduction.

The camera switch 131 is electrically connected to the camera 120. In this embodiment, the camera switch 131 is disposed on a support board 130 separated from the support frame 110 on which the camera 120 is disposed.

The wire 132 extending from the support board 130 can be used to connect circuits on the support board 130 to other internal components. For the purpose of simple description, only a part of the wire 132 is illustrated in FIG. 2.

In some embodiments, the camera 120 on the support frame 110 and the camera switch 131 on the support board 130 may be connected through a wire 132.

In some embodiments, the camera switch 131 is, for example, a switch of a physical switch button, so as to physically touch a real connecting rod 163 extending from the back of the shutter 170 to physically control the camera 120 to be enabled.

The connecting rod 163 extends along an X direction and has an N-shape bypassing the support frame 110. In this embodiment, the connecting rod 163 is physically linked to the latch body 153 of the latch mechanism. Once the latch body 153 slides toward the X direction, the connecting rod 163 can be driven away from the camera switch 131, thereby disenabling and enabling the camera function of the camera 120. On the other hand, in this embodiment, the camera 120 can be physically shielded after sliding the latch body 153 through the cover 159 linked with the latch body 153. For details, please refer to following FIGS. 3 and 4. As such, through the latch body 153, the physical shielding of the camera 120 and the physical control of the camera 120 on/off can be realized at the same time.

Figure 3:
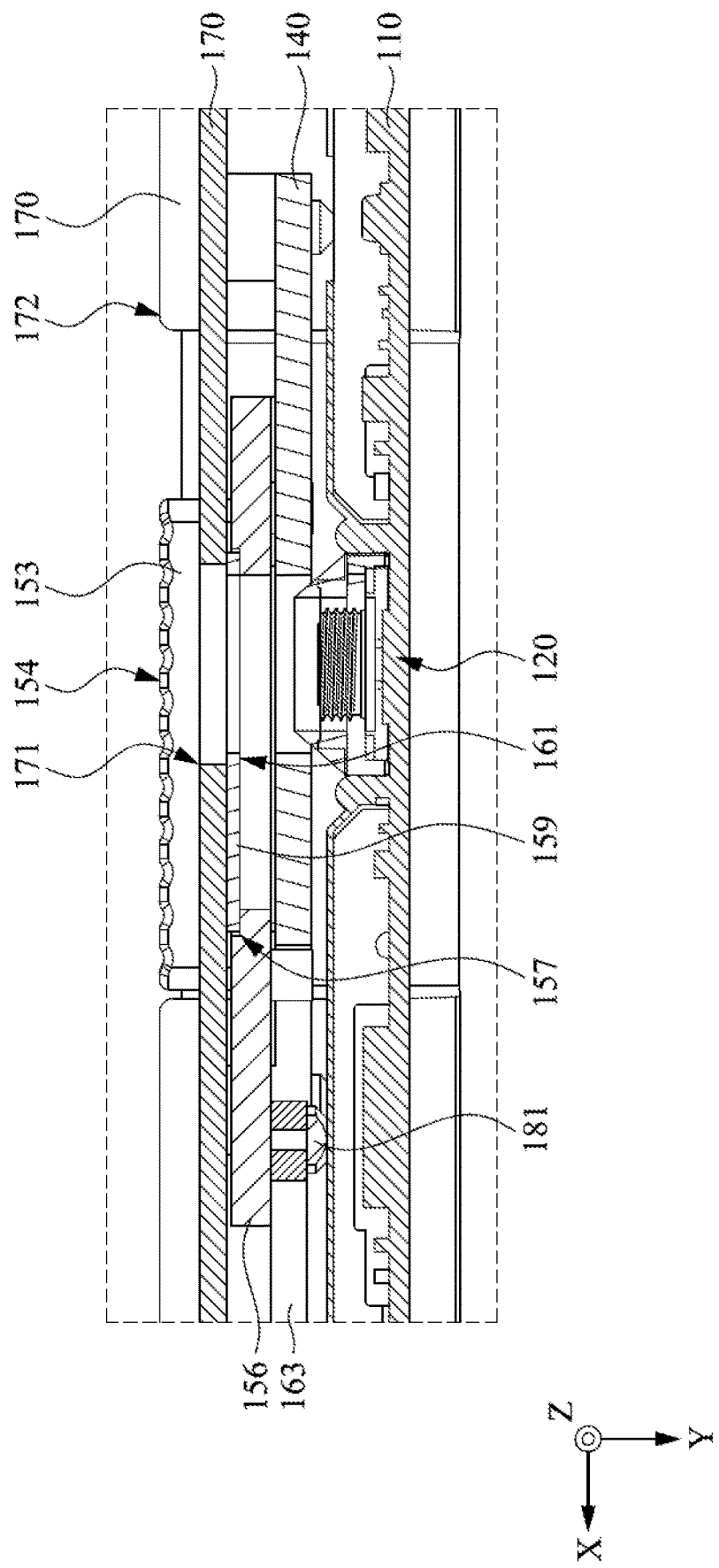
FIG. 3 illustrates a top cross-sectional view adjacent a camera in the camera structure according to one embodiment of the present disclosure.
Figure 4:
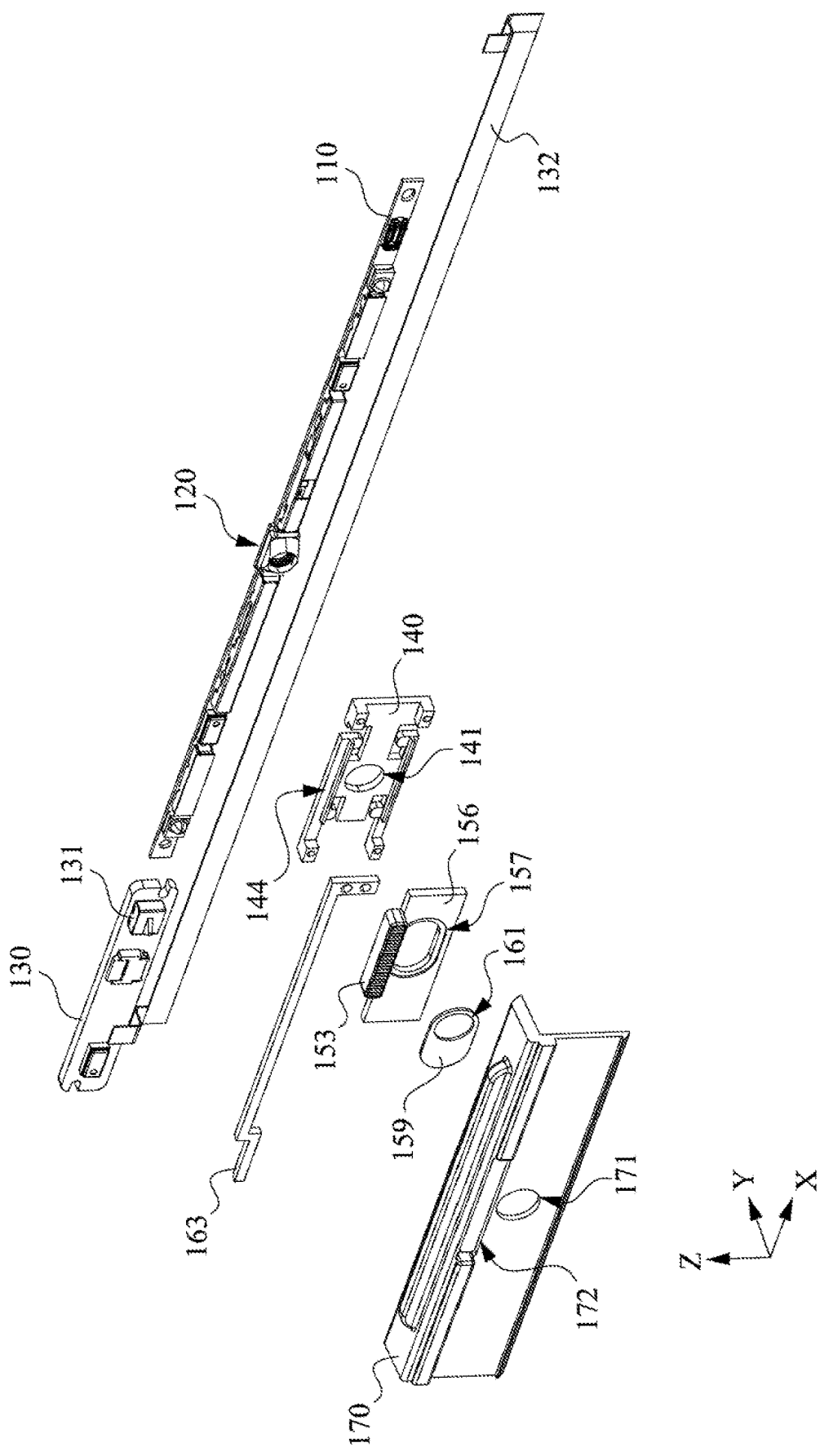
FIG. 4 illustrates an exploded view of a camera structure according to one embodiment of the present disclosure.

Reference is made by FIGS. 3 and 4 to further illustrate the structure of the camera structure 100 of the present disclosure. FIG. 3 illustrates a top cross-sectional view adjacent a camera 120 in the camera structure 100 according to one embodiment of the present disclosure. FIG. 4 illustrates an exploded view of a camera structure 100 according to one embodiment of the present disclosure.

As shown in FIGS. 3 and 4, the camera 120 is disposed on the support frame 110, and the shutter 170 covers most of the structure of the support frame 110 except for the camera 120 in the Y direction. A latch mechanism is arranged between the camera 120 and the shutter 170. The latch mechanism includes a latch body 153, a holder 156 connected to the latch body 153, a cover 159 and a connecting rod 163.

The holder 156 has an accommodating groove 157 for accommodating the cover 159. The cover 159 is provided with an opening 161 to expose the camera 120. By sliding the latch body 153, the camera 120 can be physically shielded by the part beyond the opening 161 of the cover 159 that can be driven.

In this embodiment, the connecting rod 163 is fastened to the holder 156, so that the connecting rod 163 can be linked with the latch body 153.

In summary, the cover 159 can be accommodated in the accommodating groove 157 of the holder 156 after the cover 159 is held in the holder 156. As shown in FIG. 3, a thickness of the cover 159 is less than a thickness of the holder 156. In other words, a depth of the accommodating groove 157 of the holder 156 is greater than the thickness of the cover 159, so that the cover 159 is physically separated from the camera 120, and when the latch body 153 slides, the cover 159 would not directly rub against other components. The connecting rod 163 can be locked on a back of the holder 156 to be linked with the sliding action of the latch body 153.

Further, a locking member 140 is provided between the camera 120 and the latching mechanism. The locking member 140 can abut the latch body 153 against the shutter 170.

As shown in FIG. 4, an opening 141 and a channel 144 are provided on the surface of the locking member 140 facing the shutter 170 and the latch body 153. The channel 144 is provided on the elastic arm portion of the locking member 140 extending along the X direction. The opening 141 is aligned with the camera 120. The locking member 140 would be locked on the shutter 170 to clamp the latch mechanism between the shutter 170 and the locking member 140. The channel 144 on the locking member 140 is aligned with the strip slit 172 of the shutter 170. Once the shutter 170 is assembled with the locking member 140, the channel 144 of the locking member 140 and the slit 172 on the shutter 170 would form a sealed track, and latch body 153 is disposed over the sealed track so that the latch body 153 protrudes from the slit 172. Therefore, the user can make the latch body 153 slide back and forth in the Y direction on the sealed track by moving a rough contact surface 154 on the latch body 153.

In this embodiment, the shutter 170 and the locking member 140 are configured to be stationary relative to the camera 120, and the latch body 153, the connecting rod 163 and the cover 159 linked with the latch body 153 move relative to the camera 120.

In the embodiment shown in FIG. 3, the opening 141 of the locking member 140, the opening 161 on the cover 159 of the latch mechanism, and the opening 171 on the shutter 170 are aligned with each other. With the sliding of the latch body 153 in the Y direction, the cover 159 on the holder 156 can deviate from the camera 120 and the connecting rod 163 can move away from the camera switch 131, so as to physically shield the camera 120 and disenable the camera 120 at the same time. Therefore, privacy of the user of the camera structure 100 can be protected.

In this embodiment, the locking member 140 can be fixed on the shutter 170 by screws. In this embodiment, the connecting rod 163 is fixed on the holder 156 by screws 181. In some embodiments, the connecting rod 163 can be fixed on the holder 156 by means of hooks or heat fusion. In some embodiments, the connecting rod 163 and the holder 156 may be integrally formed.

Figure 5B:
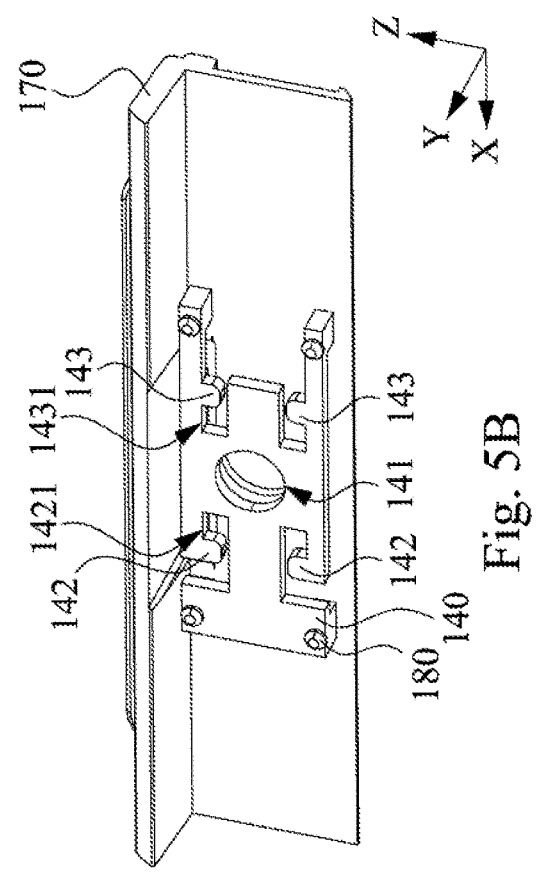
FIG. 5B illustrates a rear view of the assembly of the shutter and the locking member in FIG. 5A.
Figure 5A:
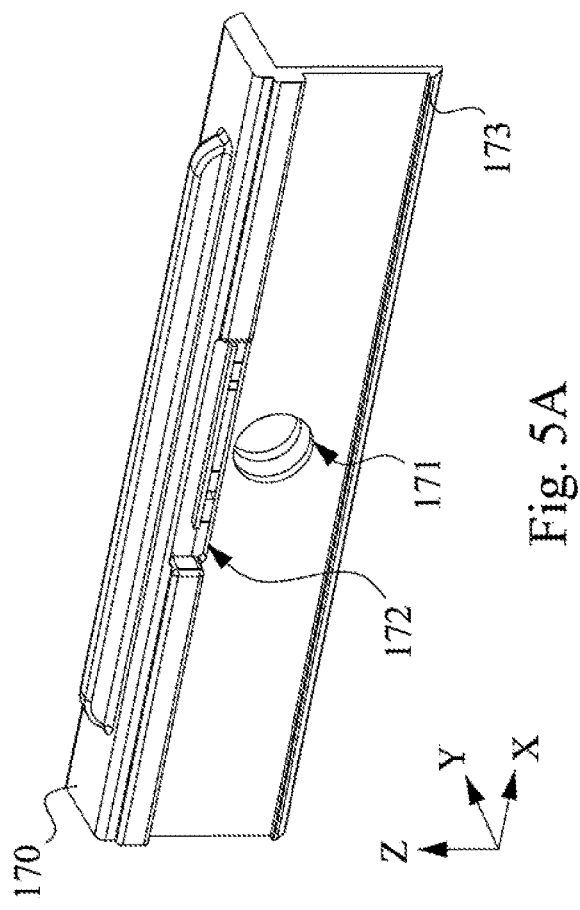
FIG. 5A illustrates a front view of the assembly of the shutter and the locking member of the camera structure according to one embodiment of the present disclosure.

Reference is made by FIGS. 5A and 5B to further describe the assembly of the shutter 170 and the locking member 140. FIG. 5A illustrates a front view of the assembly of the shutter 170 and the locking member 140 of the camera structure 100 according to one embodiment of the present disclosure. FIG. 5B illustrates a rear view of the assembly of the shutter 170 and the locking member 140 in FIG. 5A.

For the purpose of simple description, some elements other than the shutter 170 and the locking member 140 are not illustrated in FIGS. 5A and 5B.

FIG. 5A illustrates the front side of the shutter 170 and the locking member 140 after the shutter 170 and the locking member 140 are assembled together. As shown in FIG. 5A, when the shutter 170 and the locking member 140 are viewed from a front in the Y direction, the locking member 140 is completely covered by the shutter 170.

FIG. 5B illustrates a back of the shutter 170 and the locking member 140 after the shutter 170 and the locking member 140 are assembled together. In this embodiment, the locking member 140 is fixed on the shutter 170 by screws 180.

Referring to FIGS. 5A and 5B at the same time, in this embodiment, the opening 171 of the shutter 170 is aligned with the opening 141 of the locking member 140. As such, the camera 120 can be exposed through the opening 141 and the opening 171.

Further, in the rear view shown in FIG. 5B, there are elastic pieces 142 and 143 on a surface of the locking member 140 facing away from the shutter 170. The elastic pieces 142 define an accommodating space 1421 on the surface of the locking member 140 facing away from the shutter 170. The elastic piece 143 defines an accommodating space 1431 on the surface of the locking member 140 facing away from the shutter 170.

In some embodiments, the elastic pieces 142 and/or the elastic pieces 143 are extended from the elastic arms of the locking member 140 in which the channels are provided. For example, in the Z direction, the upper elastic pieces 142 and 143 are extended downward by the elastic arms provided with the channel 144 (as shown in FIG. 4), wherein the channel 144 of the locking member 140 and the shutter 170 forms the sealed track for the sliding of the latch body 153.

Reference is made by FIGS. 6A and 6B to further describe the mechanism of the sliding of the latch mechanism. FIGS. 6A and 6B are rear views illustrating the assembly of the latch mechanism, which includes the latch body 153, the holder 156, the cover 159 and the connecting rod 163, and the locking member 140 of the camera structure according to one embodiment of the present disclosure.

For the purpose of simple description, some elements beyond the latch mechanism and the locking member 140 are not illustrated in FIGS. 6A and 6B. For example, the shutter 170 is not shown in FIGS. 6A and 6B.

In FIGS. 6A and 6B, when the latch mechanism is fixed on the shutter 170 by the locking member 140, the latch body 153 would be limited by the sealed track formed the channel 144 of the locking member 140 and the slit 172 of the shutter 170. In order to further illustrate the sliding of the latch body 153, FIGS. 6A and 6B illustrate the assembled configurations of the latch mechanism and the locking member 140.

FIG. 6A illustrates a configuration in which the latch body 153 is located at a first position. As shown in FIG. 6A, when the latch body 153 is at the first position, the opening 161 of the cover 159 on the holder 156 of the linking latch body 153 would be aligned with the opening 141 of the locking member 140.

FIG. 6B illustrates a configuration in which the latch body 153 is located at a second position. In FIG. 6B, the latch body 153 moves along the X direction relative to the first position in FIG. 6A, so that the opening 161 and the opening 141 are displaced. Therefore, the portion the cover 159 beyond the opening 161 can cover the opening 141 of the locking member 140, thereby covering the camera 120.

On the other hand, from the rear view illustrated in FIG. 6A, the rear surface of the holder 156 of the latch mechanism further includes a protrusion 1581 and a protrusion 1582. When the latch body 153 is at the first position, the protrusion 1581 is accommodated in the accommodating space 1421 defined by the elastic piece 142, and the protrusion 1582 is located outside the accommodating space 1431 defined by the elastic piece 143.

Further, in the rear view of FIG. 6B, when the latch body 153 moves in the X direction, the protrusion 1581 leaves the accommodating space 1421 originally contained therein, and the protrusion 1582 is pushed into the accommodating space 1431 defined by the elastic piece 143.

In other words, the elastic piece 142 and the elastic piece 143 can limit the interlocking movement of the holder 156, thereby restricting the movement of the latch body 153 and the connecting rod 163 of the latch mechanism together. In this way, when the latch body 153 of the latch mechanism is moved in place, the elastic pieces 142 and 143 on the locking member 140 can stand against the protrusions 1581 and 1582 respectively to avoid unintended misalignment. When the latch body 153 needs to slide to other positions, a thrust force needs to be applied in the X direction, so that the protrusion 1581 and the protrusion 1582 are able to overcome the limit of the elastic piece 142 and the elastic piece 143, respectively. The protrusion 1581, the protrusion 1582, the elastic piece 142 and the elastic piece 143 induce slightly elastic interference, which can also make the user feel like a manual switch when in use.

In FIGS. 6A and 6B, the connecting rod 163 of the latch mechanism is locked to the holder 156 extending from the latch body 153 by the screws 181. Along with the sliding of the latch body 153 in the X direction, the connecting rod 163 can also move in the X direction. As mentioned above, the connecting rod 163 would move closer to or away from the camera switch 131 in the X direction to physically enable or disable the camera 120 through physical contact.

Figure 7A:
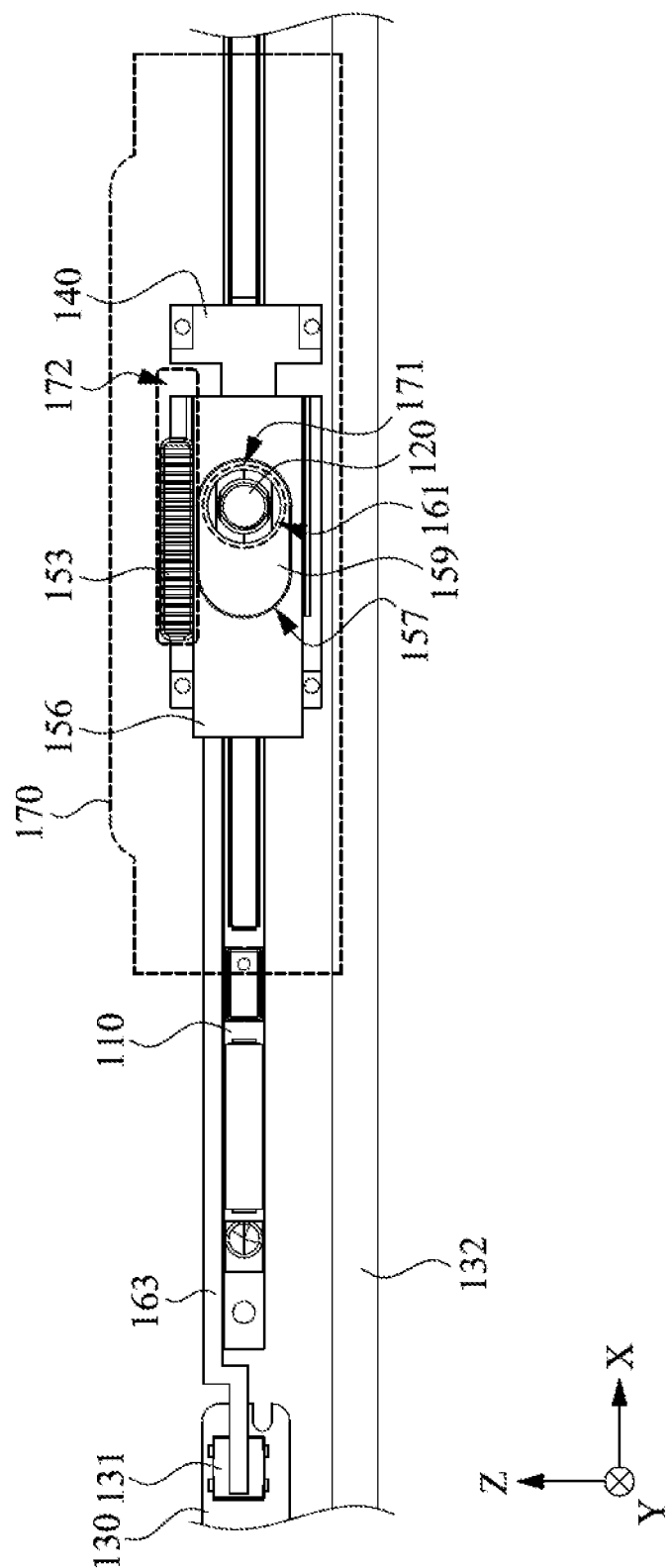
FIGS. 7A and 7B are schematic views of the latch body of the camera structure at a first position and a second position according to one embodiment of the present disclosure, respectively.
Figure 7B:
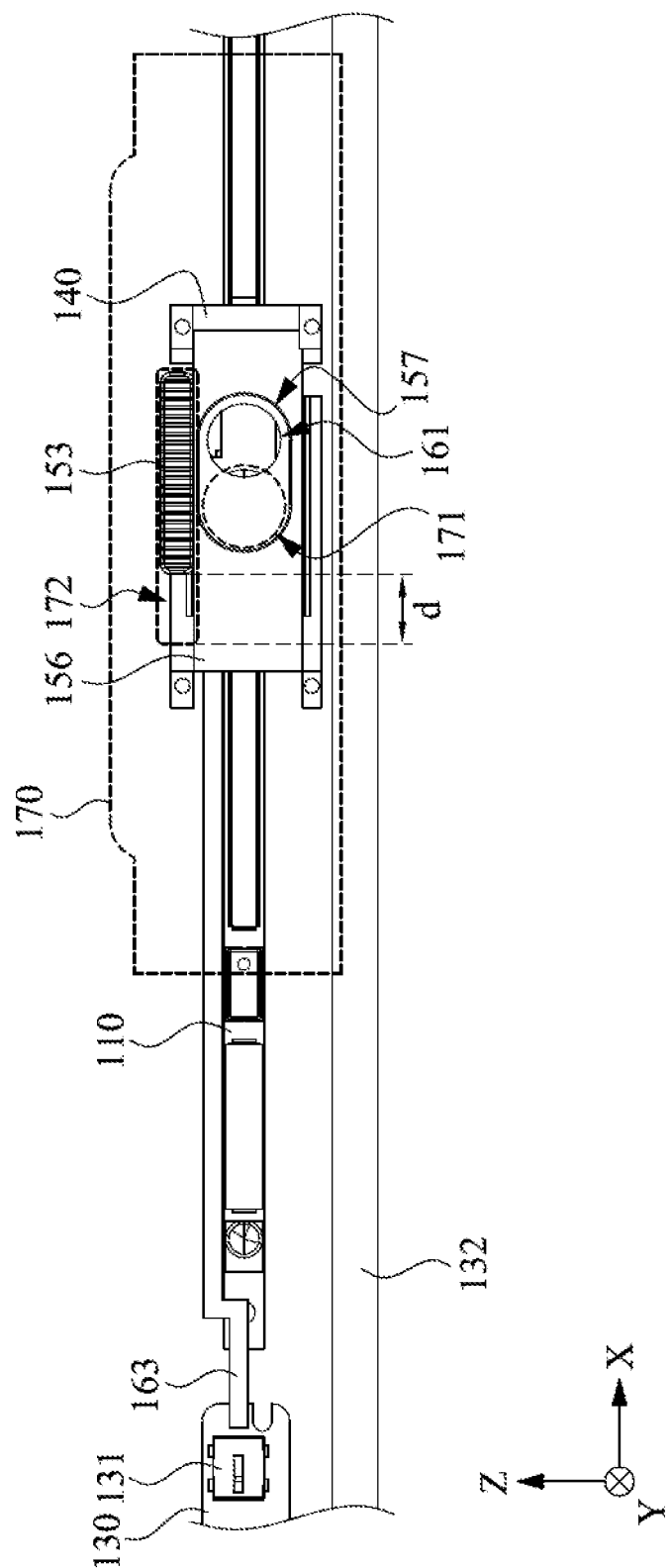

FIGS. 7A and 7B are schematic views of the latch body 153 of the camera structure 100 at a first position and a second position according to one embodiment of the present disclosure, respectively. FIGS. 7A and 7B correspond to FIG. 6A and FIG. 6B, respectively. For purpose of simple description, shutter 170 is illustrated with dash line in FIGS. 7A and 7B.

As shown in FIG. 7A, when the latch body 153 is at the first position, the opening 171 of the shutter 170, the opening 161 of the cover 159 on the holder 156 and the opening 141 (not shown in FIG. 7A for the purpose of simple description) of the locking member 140 are aligned, so that the camera 120 exposed. At the same time, the connecting rod 163 linked with the latch body 153 directly touches the camera switch 131, so that the camera 120 is normally activated. In other words, the connecting rod 163 interferes with the camera switch 131 to enable the camera 120 at the first position.

In FIG. 7B, when the latch body 153 is located at the second position, the opening 161 of the cover 159 on the holder 156 is displaced from the opening 171 of the shutter 170 and the opening 141 of the locking member 140, so that the cover 159 shields the camera 120. As shown in FIG. 7B, when the latch body 153 moves to the second position, the holder 156 is linked to the latch body 153 and move, so that the cover 159 accommodated in the holder 156 moves to shield the camera 120. The cover 159 is exposed from the opening 171 of the shutter 170 since the camera 120 is covered by the cover 159. At the same time, the connecting rod 163 linked with the latch body 153 moves away from the camera switch 131, causing the camera 120 to being disenabled.

Therefore, a balance for shading the camera 120 and enabling the camera 120 is reached. Once the user needs to enable the camera 120, the latch body 153 is slid to the first position illustrated in FIG. 7A, the shielding of the cover 159 for the camera 120 is cancelled and the connecting rod 163 contacts the camera switch 131, so that the real shielding of the camera 120 is removed and the camera 120 is enabled at the same time. When the user wants to stop using the camera 120, the latch body 153 is slid to the second position illustrated in FIG. 7B, the cover 159 accommodated in the holder 156 restores to cover the camera 120 and the connecting rod 163 is far away from the camera switch 131, so that the camera 120 is shielded by the cover 159 and is enabled at the same time.

In this embodiment, the latch body 153 slides the distance d in the X direction from the first position to the second position. In some practical examples, the distance d is, for example, 3.5 mm. In some embodiments, the opening 161 of the cover 159 is circular, and the diameter of the opening 161 can be designed to be similar to the distance d.

In some embodiments, the material of the holder 156 can be selected from polyoxymethylene (POM). The polyoxymethylene has wear-resistant properties, which is beneficial to withstand the wear caused by sliding and prolong the service life of the holder 156.

In some embodiments, the material of the cover 159 includes, for example, PET film, i.e. mylar.

Figure 8:
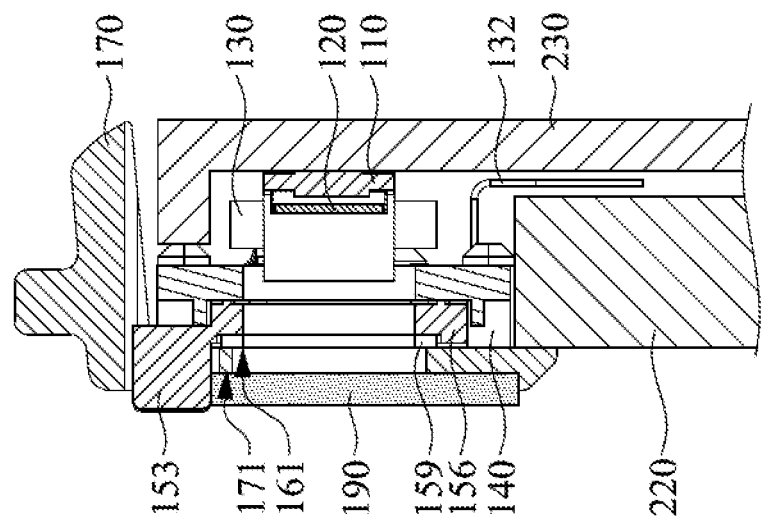
FIG. 8 illustrates a schematic partial cross-sectional view of a camera structure assembled to a display device according to one embodiment of the present disclosure.

FIG. 8 illustrates a schematic partial cross-sectional view of a camera structure 100 assembled to a display device according to one embodiment of the present disclosure, wherein FIG. 8 shows a configuration in which the latch body 153 is at the first position, and the camera 120 is enabled and exposed from the openings 171 and 161.

As shown in FIG. 8, in an embodiment of the present invention, the camera 120 of the camera structure 100 is disposed on the display panel 220, and the support frame 110 supporting the camera 120 abuts on the back cover 230. Further, in the embodiment illustrated in FIG. 8, a transparent cover 190 is further provided on the shutter 170 to avoid dust intrusion. The transparent cover 190 is disposed under the latch body 153 and is completely supported by the shutter 170.

Figure 9:
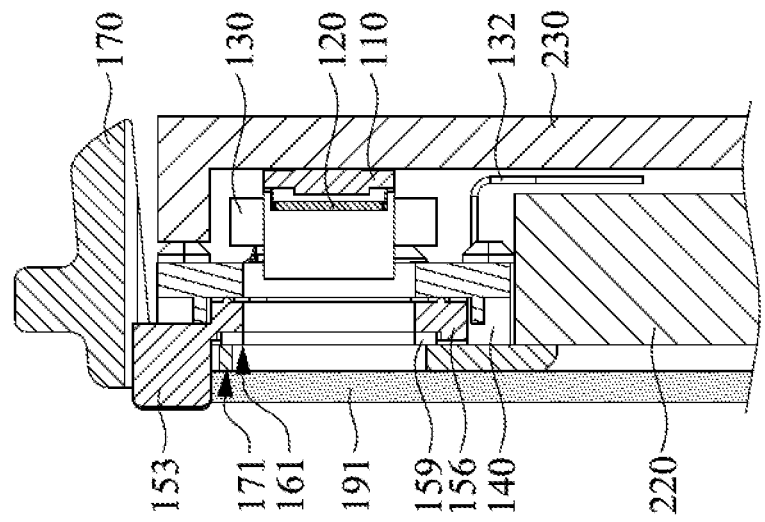
FIG. 9 illustrates a schematic partial cross-sectional view of a camera structure assembled to a display device according to one embodiment of the present disclosure.

FIG. 9 illustrates a schematic partial cross-sectional view of a camera structure 100 assembled to a display device according to one embodiment of the present disclosure.

With respect to the embodiment of FIG. 8, in FIG. 9, the transparent cover 191 is selected to cover the opening 171 and the opening 161 of the exposed camera 120. A difference of the transparent cover 191 from the transparent cover 190, the transparent cover 191 extends beyond the shutter 170 and further covers the display panel 220.

In summary, in one or more embodiments of the present disclosure, a camera structure is provided. A camera of the camera structure is shielded by a designed latch mechanism, and the camera is activated or deactivated by touching or moving away from a real switch button through the connecting rod. It prevents the user from enabling the camera of the camera structure without knowing it, so that privacy of the user of the camera structure can be protected.

Although the present disclosure has been described in considerable detail with reference to certain embodiments thereof, other embodiments are possible. Therefore, the spirit and scope of the appended claims should not be limited to the description of the embodiments contained herein. In view of the foregoing, it is intended that the present disclosure cover modifications and variations of this invention provided they fall within the scope of the following claims.

What is claimed is:

1. A camera structure, comprising:
   a support frame;
   a camera supported by the support frame;
   a camera switch electrically connected to the camera and configured to enable and disable the camera; and
   a latch mechanism comprising a latch body and a cover and a connecting rod linking the latch body, wherein the latch body is slidable, the latch body is configured to move between a first position and a second position,
   when the latch body is at the first position, the camera is exposed from a first opening of the cover and the connecting rod interferes with the camera switch to enable the camera,
   when the latch body is at the second position, the cover shields the camera and the connecting rod moves away from the camera switch to disenable the camera.

2. The camera structure of claim 1, wherein the latch mechanism comprises:
a holder connected to the latch body and having an accommodating groove accommodating the cover, wherein a depth of the accommodating groove is greater than a thickness of the cover, so that the cover is spatially separated from the camera.

3. The camera structure of claim 2, wherein a material of the holder comprises polyoxymethylene.

4. The camera structure of claim 2, wherein the connecting rod of the latch mechanism is connected to one side of the holder, and the connecting rod bypasses the support frame on which the camera is supported.

5. The camera structure of claim 1, further comprising:
a shutter covering the camera and the latch mechanism, wherein when the latch body is at the first position, the first opening of the cover is aligned with a second opening of the shutter, so that the camera is exposed from the second opening.

6. The camera structure of claim 5, wherein the shutter further comprises a strip slit, the latch body of the latch mechanism protrudes from the strip slit to be touched, and the latch body is moved between the first position and the second position.

7. The camera structure of claim 6, further comprising:
a transparent cover disposed below the latch body protruding from the strip slit, wherein the second opening of the shutter is covered by the transparent cover.

8. The camera structure of claim 5, further comprising:
a locking member abutting the latch mechanism to the shutter, wherein the locking member has a channel on a first surface of the locking member facing the shutter, the channel of the locking member is sealed by the shutter to form a closed track, the closed track is configured to accommodate the latch body so that the latch body of the latch mechanism slides relative to the locking member and the shutter.

9. The camera structure of claim 8, wherein:
the locking member comprises a second surface opposite to the first surface and has a first elastic piece at one end of the channel of the locking member and a first protrusion protruding towards the second surface, the first elastic piece and the second surface of the locking member form a first accommodating space, the first accommodating space is configured to accommodate the first protrusion of the locking member, the first protrusion is held in the first accommodating space when the latch body is at the first position, and the first protrusion moves out of the first accommodating space through the first elastic piece when the latch body moves to the second position from the first position.

10. The camera structure of claim 8, wherein:
the locking member comprises a second surface opposite to the first surface and has a second elastic piece at one end of the channel of the locking member and a second protrusion protruding towards the second surface, the second elastic piece and the second surface of the locking member form a second accommodating space, the second accommodating space is configured to accommodate the second protrusion of the locking member, the second protrusion is out of the second accommodating space when the latch body is at the first position, and the second protrusion moves into the second accommodating space through the second elastic piece when the latch body moves to the second position from the first position.

11. A camera structure, comprising:
a camera;
a camera switch electrically connected to the camera and configured to enable and disable the camera; and
a latch mechanism being movable relative to the camera and the camera switch, wherein the latch mechanism comprises:
a holder;
a cover supported by the holder and having a first opening;
a connecting rod extending to the camera switch and having an end fixed on the holder; and
a latch body extended from the holder and configured to move between a first position and a second position, wherein the camera is exposed from the first opening of the cover and the connecting rod interferes with the camera switch to enable the camera when the latch body is at the first position, and the cover shields the camera and the connecting rod moves away from the camera switch to disenable the camera when the latch body is at the second position.

12. The camera structure of claim 11, further comprising:
a shutter covering the camera and the latch mechanism, wherein when the latch body is at the first position, the first opening of the cover is aligned with a second opening of the shutter, so that the camera is exposed from the second opening.

13. The camera structure of claim 12, wherein the shutter further comprises a strip slit, the latch body of the latch mechanism protrudes from the strip slit to be touched, and the latch body is moved between the first position and the second position.

14. The camera structure of claim 13, further comprising:
a transparent cover disposed below the latch body protruding from the strip slit, wherein the second opening of the shutter is covered by the transparent cover.

15. The camera structure of claim 12, further comprising:
a locking member abutting the latch mechanism to the shutter, wherein the locking member has a channel on a first surface of the locking member facing the shutter, the channel of the locking member is sealed by the shutter to form a closed track, the closed track is configured to accommodate the latch body so that the latch body of the latch mechanism slides relative to the locking member and the shutter.

16. The camera structure of claim 11, wherein a material of the holder comprises polyoxymethylene.

17. The camera structure of claim 11, wherein the camera switch comprises a switch button.

18. A display device, comprising:
a display panel;
a bezel surrounding the display panel; and
a camera structure disposed at the bezel and above the display panel, wherein the camera structure comprises a camera, a camera switch electrically connected to the camera and configured to enable and disable the camera and a latch mechanism being movable relative to the camera and the camera switch, wherein the latch mechanism has a first opening, when the latch mechanism is at a first position, the first opening of the latch mechanism exposes the camera and the latch mechanism touches the camera switch to enable the camera, and when the latch mechanism is at a second position, the first opening of the latch mechanism is misaligned with the camera and the latch mechanism moves away from the camera switch to disable the camera.

19. The display device of claim 18, wherein the camera structure further comprises:
- a shutter covering the camera and the latch mechanism, wherein when the latch mechanism is at the first position, the first opening of the latch mechanism is aligned with a second opening of the shutter, so that the camera is exposed from the second opening.

20. The display device of claim 19, further comprising:
- a transparent cover disposed below the latch mechanism protruding from the shutter, wherein the second opening of the shutter is covered by the transparent cover, and the transparent cover extends beyond the shutter and covers the display panel.

* * * * *